Patented Aug. 30, 1949

2,480,348

UNITED STATES PATENT OFFICE 2,480,348

SATURATED ESTERS OF KETONE FORMALDEHYDE CONDENSATION PRODUCTS

Harold Wittcoff, Minneapolis, Minn., assignor to General Mills, Inc., a corporation of Delaware No Drawing. Application October 21, 1948, Serial No. 55,840

6 Claims. (Cl. 260—233)

The present invention relates to the saturated higher fatty acid esters of the ketone formaldehyde condensation products described in my copending application Serial No. 599,948, filed June 16, 1945, entitled Esters, of which the present application is a continuation-in-part. The polyhydroxy condensation products which are contemplated by the present invention are those which have at least four hydroxyl groups and which result from the condensation of formaldehyde with a ketone having at least four active hydrogen atoms adjacent the carbonyl group. The invention contemplates the esterification of these polyhydroxy condensation products with saturated higher fatty acids including saturated aliphatic acids containing from seven to twenty-two or more carbon atoms. The invention contemplates the substantially complete esterification of the polyhydroxy compounds with these saturated higher fatty acids, the acids being used either singly or in admixture. The resultant products vary from viscous liquids to hard solids depending upon the higher saturated fatty acids or combination of acids employed. The products find use as plasticizers, waxes, intermediates, and the like, depending upon their particular physical and/or chemical characteristics.

It is, therefore, a primary object of the present invention to provide saturated higher fatty acid esters of polyhydroxy condensation products of formaldehyde and a ketone, the condensation products containing at least four hydroxyl groups and being substantially completely esterified with the saturated higher fatty acids.

This and other objects of the invention will be more fully apparent from the following description of the invention with particular reference to the examples which are to be considered as illustrative only and not as limiting the invention.

In general, the invention involves the preparation of esters of saturated fatty acids of more than seven carbon atoms, of polyhydroxy condensation products of formaldehyde with ketones. These saturated esters include a wide variety of compounds in view of the variation which is possible in the ketone used in the condensation, the extent of condensation and accordingly the number of hydroxyl groups present in the condensation product, and the nature of the saturated fatty acids employed for esterification.

The polyhydroxy condensation products employed in the present invention may be derived from any aliphatic or alicyclic ketone which has at least four active hydrogens adjacent the carbonyl group. Typical ketones of this type include cyclohexanone, cyclopentanone, acetone, methyl ethyl ketone, diethyl ketone, diacetyl, acetonylacetone, diacetone alcohol, levulinic acid, and the like. In the preparation of the polyhydroxy condensation products it is usually preferred to employ at least one mole of formaldehyde per mole of active hydrogen in the ketone. In those instances in which the ketone is capable of being reduced to a secondary alcohol group an additional mole of formaldehyde should be employed for this purpose. In addition, it is usually preferred to employ a slight excess of formaldehyde over that theoretically required.

The preparation of some of the condensation products of ketones referred to herein have been recorded in the literature. Apel et al., Ann., 289, 46 (1896), and Apel and Tollens, Ber., 27, 1087 (1894). Improved methods of preparing these condensation products will be found in the examples of the present application and in the copending application of the present inventor, Serial No. 599,947, filed June 16, 1945, entitled Condensation of ketones with formaldehyde, now Patent No. 2,462,031, February 15, 1949. The condensation reaction results in a mixture of products which may be of varying degrees of hydroxylation and in some cases may be in the form of a syrupy liquid. It will be apparent that this mixture of condensation products may be used in that condition for esterification if it is not desired to produce the ester as a pure compound.

If the syrup is not readily crystallizable, and if a pure crystalline condensation product is desired, it may be obtained in some instances by forming an acetal or ester or other derivative which may subsequently be hydrolyzed to the free hydroxy compound. The formation of an acetal often takes place readily when the crude syrup is stirred with acetone. Usually there is sufficient acid present as a result of the method of preparation to catalyze acetal formation. If necessary, a small amount of acid catalyst, such as sulfuric acid, may be added. As an alternative, an acetal derivative may be obtained by heating the syrup in aqueous methanol with an aldehyde such as benzaldehyde and a small amount of mineral acid for a suitable period of time. The acetal may be isolated from the solution by filtration after which it may be purified by crystallization from a suitable solvent such as alcohol. The isolated acetal derivative may be converted to the hydroxy compound by treatment with a strong acid, such as hydrochloric acid. The volatile ketone or aldehyde may then be distilled off, leaving the pure hydroxy compound as a light-colored oil which crystallizes readily on cooling. Where the aldehyde liberated is as high boiling as benzaldehyde, the application of vacuum or the use of steam distillation is desirable.

The esterification with the fatty acid may be accomplished with either the crude syrup or with the isolated pure hydroxy compound. Likewise, it is possible to esterify the acetal directly. This may be accomplished under the influence of an acid catalyst, preferably oxalic acid as it effects the least amount of discoloration. Other strong acidic catalysts, such as p-toluenesulfonic acid and sulfuric acid, may likewise be used to catalyze this reaction.

Where the free hydroxy compound is employed in the esterification, any of the well known processes of the prior art may be employed. Several advantageous procedures, however, have been evolved. In one case it has been found possible to obtain excellent products by heating and stirring at around 200° C., equivalent quantities of the acid and the polyfunctional alcohol for a period of three to four hours. The polyfunctional alcohol, if it is used in a syrupy condition, may advantageously be brought into contact with the other reagents by dissolving it in water. During the reaction the water is rapidly driven off. The color of the product is improved by the use of an inert atmosphere such as that provided by carbon dioxide or nitrogen whereas the rate of esterification is accelerated by the employment of a small amount of catalyst such as the stearates, naphthenates, abietates, or other fat soluble salts of metals such as calcium, cadmium, cerium, strontium, zinc, and the like. Catalysts such as litharge, and those of an acidic nature such as sulfuric acid and hydrogen chloride, may be valuable in some cases. Near the end of the reaction the application of a vacuum is valuable in order to remove the last trace of volatile or unreacted material. Following this general procedure then, it is easily possible to obtain a product with an acid number and hydroxyl number lower than 30. If still lower values are desired, heating may be continued for a longer period of time. In cases where a product is desired which is completely free of any fatty acid, the material may be dissolved in petroleum ether or naphtha and titrated to neutrality with alcohol caustic. The precipitated soaps may then either be filtered off or extracted with aqueous ethanol. The product is then recovered from the hydrocarbon solution by desolvation. Another process of purification which may be employed when an extremely pure product is desired is that in which unreacted acid and highly hydroxylated or partially esterified alcohol is extracted by the use of ethanol.

Still another method of esterification which has been found particularly advantageous is that in which a small amount of a hydrocarbon solvent, such as xylene, is used for the purpose of removing the water of esterification azeotropically. By controlling the amount of solvent employed, the temperature of the reaction mixture may be raised to any desired degree. The advantage of this derives from the fact that any water produced is readily removed thus driving the reaction in the desired direction.

The esterification may likewise be accomplished azeotropically by the use of high boiling hydrocarbon solvent such as the isomeric tri-isopropylbenzenes in sufficient quantity to keep the soluble reactants and products in solution. Here again an azeotrope is formed with the water of esterification. This, however, is not as satisfactory as the use of a small amount of solvent such as xylene since it requires the use of a large amount of solvent which because of its low volatility is more difficult to remove at the end of a reaction. In either case the apparatus may be arranged so that the azeotropes distill in such a manner that the water is separated in the distillate and the hydrocarbon is returned to the reaction vessel.

The esters may be obtained also by a transesterification reaction between the polyhydric alcohol and a glyceride such as soybean or linseed oil or other esters of saturated or unsaturated higher fatty acids. Here again, an elevated temperature and stirring are advisable together with the use of catalysts such as oil soluble salts of calcium, strontium, barium, zinc, lithium, and the like. The esters may also be prepared by any of the other methods of esterification commonly used in the art.

The acids which are used for esterification include all the saturated fatty acids having seven or more carbon atoms up to twenty-two and higher. Such acids include capric, lauric, myristic, palmitic, stearic, arachidic and behenic acids. The physical and chemical properties of the resultant products depend upon the particular fatty acids employed. In general the esters which are produced from lauric acid and from shorter chain saturated fatty acids are liquid products and find their principal utility as plasticizers. Those derived from palmitic and longer chain saturated fatty acids are solid in nature and are excellent waxes. These solid products are also useful as plasticizers. Variations in the physical properties between these extremes are possible by varying the fatty acids and by employing mixtures.

These esters are compatible with a wide variety of resins and cellulose derivaties which they serve to plasticize, soften, elasticize, lubricate, and otherwise modify. The resulting compositions may be molded under pressure, kneaded or milled on differential rolls or mixers, dissolved in solvents to form coating compositions, extruded to form ribbons, fibers, or other structural shapes, emulsified or otherwise fabricated into useful compositions.

The solid products may be varied so as to simulate natural waxes such as beeswax and carnauba wax or any properties intermediate the properties of these two natural waxes. Furthermore the wax compositions of the present invention are compatible with the common natural waxes such as paraffin, montan, carnauba, beeswax, ceresin, and similar waxes. Thus blends can be made to suit specific purposes. The present waxes can also be blended with such diverse substances as rosin, bentonite, metallic naphthenates, metallic stearates, and the like. Moreover, the waxy compounds of the present invention are soluble in inexpensive coal-tar hydrocarbons and petroleum distillates, and yield gels with these solvents, which gels are valuable in the formulation of wax compositions such as paste and polishing waxes. The waxes can be emulsified by any of the usual emulsifying agents such as amine or hydroxyamine soap, and the emulsions are capable of holding large quantities of water.

The following examples will serve to illustrate the invention.

Example 1

In an appropriate vessel equipped with agitator and reflux condenser was placed 392 parts of cyclohexanone, 660 parts of formaldehyde in the form of paraformaldehyde, 3500 parts of water, and 112 parts of calcium oxide. With stirring the temperature of the solution rose spontaneously to 55° C. whereupon the exothermic nature of the reaction was checked by external cooling. Thereafter the reaction mixture was heated and stirred at 50-55° C. for two hours. The reaction mixture after having been acidified to Congo red paper with dilute sulfuric acid was filtered and desolvated to yield a syrup which crystallized readily on trituration with alcohol. Crystallization from absolute ethanol yielded a product melting at 130-131° C. whose structure is indicated by I.

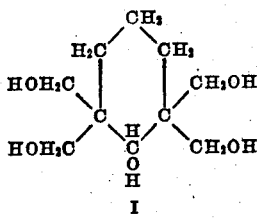

I

A mixture of 50 parts of the polyhydric alcohol and 324 parts of stearic acid was heated at 210° C. with stirring. As soon as water was evolved the temperature was raised to 215° C. whereupon a homogeneous reaction mixture resulted. Thereafter the mixture was heated and stirred at this temperature for one hour, vacuum having been applied at the end of the reaction. The product was allowed to precipitate from 95% alcohol to yield a hard, white wax which melted at 59° C. The saponification equivalent of 311 (calculated 310.5) and the low hydroxyl number of 6 indicated that the product was the pentastearate of 2,2,6,6-tetramethylolcyclohexanol. This material possessed very desirable wax-like properties particularly because of its extreme hardness and pleasing light color.

Example 2

A mixture of 55 parts of 2,2,6,6-tetramethylolcyclohexanol was reacted with 280 parts of commercial grade stearic acid. A catalyst comprising 1.6 parts of lead stearate was used, and the esterification was carried out azeotropically employing xylene as the azeotropic solvent. The reaction proceeded with continuous stirring. The reaction flask was equipped with a Dean-Stark tube which allowed the water of reaction to collect at the bottom of the tube, whereas the xylene returned to the reaction mixture.

The reaction mixture was heated rapidly to 180° C. Thereafter the temperature was allowed to reach 235° C. over a period of 75 minutes. The temperature was maintained at 235° C. for a total reaction time of 6.5 hours. The xylene was removed to obtain a white, homogeneous product which possessed an acid number of 4.5, a hydroxyl number of 5.5, and consisted primarily of the pentastearate of 2,2,6,6-tetramethylolcyclohexanol. The product had a ball and ring melting point of 43° C. This product is capable of further purification by precipitating it from a hot solution of alcohol.

Example 3

A mixture of 52.5 parts of 2,2,6,6-tetramethylolcyclohexanol and 144 parts of technical caprylic acid was reacted in the presence of 1.6 parts of lead stearate as a catalyst. Fifty parts of xylene was added in order to provide an azeotropic solvent for removal of the water of reaction. The apparatus was the same as that described in Example 2. The reaction mixture was heated rapidly to 165° C., after which the temperature was raised to 205° C. during a period of one hour. During the second hour of heating, the temperature was raised to 225° C. and thereafter slowly to 235° C. A total reaction time of 8 hours was employed, whereupon the xylene was removed in vacuo. There resulted a light colored viscous liquid with an acid number of 11.3 and a hydroxyl number of 16.0.

Example 4

A mixture of 52.5 parts of 2,2,6,6-tetramethylolcyclohexanol and 200 parts of lauric acid was reacted in the presence of a catalytic amount of lead stearate (1.6 parts). As in the previous examples, xylene was used as an azeotropic solvent, and the esterification was carried out in the apparatus described in Example 2. The reaction mixture was heated to 165° C., whereupon the temperature was raised to 208° C. over a period of one hour and to 235° C. during the second hour. The total reaction time was 8 hours, and the product which resulted was a very viscous liquid at room temperature. It solidified when immersed in ice water and showed a tendency to solidify at room temperature after long standing.

Example 5

In a vessel equipped with an agitator and a reflux condenser was placed 116 parts of acetone, 480 parts of formaldehyde in the form of paraformaldehyde and 1700 parts of water. Thereafter 56 parts of calcium oxide was added with stirring. The reaction mixture thereupon was heated to 50° C. whereupon external heating was discontinued. The exothermic nature of the reaction caused the temperature to rise to 90° C. whereupon the reaction mixture was cooled to room temperature. If desired, the same effect may be attained by maintaining the reaction mixture at a temperature of 50°-55° C. for one to three hours. The solution thereupon was treated with dilute sulfuric acid until it was barely acid to Congo red indicator. Oxalic acid solution was added to make the reaction mixture strongly acid to Congo red indicator and to precipitate the last traces of calcium ion. The easily filtrable precipitate of calcium sulfate and calcium oxalate was removed whereupon the aqueous solution was evaporated in vacuo. The almost water-white syrup which resulted was treated with an organic solvent such as benzene and again evaporated in vacuo, the benzene serving to remove occluded water azeotropically. The syrup which resulted had a hydroxyl content of 28-30% and contained a substantial amount of an anhydroenneaheptitol which may be more accurately described as tetrahydro-3,3,5,5-tetrakis-(hydroxymethyl)-4-pyranol.

A mixture of 75 parts of the condensation product, 144 parts of commercial caprylic acid and 1.6 parts of lead stearate was esterified azeotropically in the presence of xylene in the apparatus described in Example 2. The reaction mixture was heated to 140° C. and thereafter was allowed to reach 190° C. over a period of one hour. During the second hour the reaction temperature reached 235° C. and was maintained there for a total reaction time of 8 hours. Upon removal of the xylene there resulted a light colored, very viscous product with an acid number of 5.6 and a hydroxyl number of 2.5.

Example 6

In an appropriate vessel was placed 288 parts of methyl ethyl ketone, 780 parts of formaldehyde as paraformaldehyde and 3000 parts of water. There was added slowly with stirring 112 parts of calcium oxide whereupon the temperature rose spontaneously to 50° C. Thereafter cooling was employed so that the temperature would not rise higher and once the initial exothermic reaction had subsided, the reaction mixture was heated and stirred at 50°–55° C. for two hours. The product was worked up as described in Example 5 for the condensation product of acetone and formaldehyde to yield an almost colorless syrup whose hydroxyl content was of the order of 30%. Because of the procedure used to remove the calcium ion the product was acidic in nature. This acidity could in large part be removed by the use of a basic ion exchange resin such as Amberlite IR-4. The syrupy product was used in the form of an aqueous solution for esterification purposes. The high hydroxyl content of the product together with certain other analytical investigations leads to the conclusion that the product is analogous to the one obtained from acetone whereupon the structure of the chief constituent may be postulated as desoxyanhydroenneaheptitol, II.

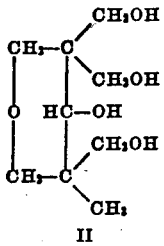

II

The tetralaurate was prepared by reacting 75 parts of the condensation product with 200 parts of lauric acid in the presence of a catalyst comprising 1.6 parts of lead stearate. The reaction was carried out azeotropically using xylene as the azeotropic solvent. The apparatus was similar to that described in Example 2. The reaction mixture was heated to 140° C. after which the reaction temperature was raised to 190° C. over a period of one hour. By the end of the second hour the reaction temperature had reached 235° C. The temperature was maintained here for eight hours whereupon the solvent was removed. A viscous liquid resulted with an acid number of 13 and a hydroxyl content of 0.

Example 7

A mixture of 75 parts of the condensation product of methyl ethyl ketone and formaldehyde and 280 parts of commercial stearic acid was esterified in the presence of 1.6 parts of lead stearate which served as a catalyst. The reaction was carried out azeotropically with the apparatus described in Example 2. The reaction mixture was heated to 140 °C. after which it was allowed to rise to 235° C. slowly over a period of two hours. The reaction mixture was maintained at 235° C. for a total reaction time of eight hours. The product was a hard, white wax with an acid number of 16.4, a hydroxyl number of 12.5, and a ball and ring melting point of 45.5° C. Further purification could be effected by allowing the product to precipitate from hot alcohol.

While various modifications of the invention have been described, it is to be understood that other variations are possible without departing from the spirit thereof.

I claim as my invention:

1. An ester of a polyhydroxy condensation product having at least four hydroxyl groups, said polyhydroxy condensation product resulting from the condensation of formaldehyde and a ketone having at least four replaceable hydrogen atoms adjacent the carbonyl group, in which the molal ratio of formaldehyde to ketone is not substantially less than one mole of formaldehyde per mole of active hydrogen in the ketone, said condensation product being substantially completely esterified with predominantly saturated higher fatty acids.

2. 2,2,6,6-tetramethylolcyclohexanol substantially completely esterified with a higher saturated fatty acid.

3. Tetrahydro - 3,3,5,5 - tetrakis - (hydroxymethyl)-4-pyranol substantially completely esterified with a higher saturated fatty acid.

4. Tetrahydro-3,3,5-tris - (hydroxymethyl) - 5-methyl-4-pyranol substantially completely esterified with a higher saturated faty acid.

5. Pentastearate of 2,2,6,6-tetramethylolcyclohexanol.

6. Tetrastearate of tetrahydro-3,3,5-tris-(hydroxymethyl)-5-methyl-4-pyranol.

HAROLD WITTCOFF.

REFERENCES CITED

The following references are of record in the file of this patent:

UNITED STATES PATENTS

| Number | Name | Date |
|---|---|---|
| 2,462,031 | Wittcoff | Feb. 15, 1949 |

FOREIGN PATENTS

| Number | Country | Date |
|---|---|---|
| 419,604 | Great Britain | Nov. 13, 1934 |